United States Patent
Lentz et al.

(10) Patent No.: US 11,099,276 B2
(45) Date of Patent: Aug. 24, 2021

(54) ANTI-SPOOFING SYSTEM FOR GNSS RECEIVERS

(71) Applicant: Trimble Inc., Sunnyvale, CA (US)

(72) Inventors: William Lentz, Portland, OR (US); Stuart Riley, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 484 days.

(21) Appl. No.: 16/002,173

(22) Filed: Jun. 7, 2018

(65) Prior Publication Data
US 2019/0377094 A1    Dec. 12, 2019

(51) Int. Cl.
*G01S 19/21* (2010.01)
*G01S 19/33* (2010.01)
*G01S 19/37* (2010.01)

(52) U.S. Cl.
CPC .............. *G01S 19/21* (2013.01); *G01S 19/33* (2013.01); *G01S 19/37* (2013.01)

(58) Field of Classification Search
CPC ........ G01S 19/21; G01S 19/215; G01S 19/28; G01S 19/33; G01S 19/37
See application file for complete search history.

(56) References Cited

U.S. PATENT DOCUMENTS

| | | | | |
|---|---|---|---|---|
| 2010/0127928 A1* | 5/2010 | Thomson | ............... | G01S 19/215 342/357.45 |
| 2016/0266259 A1* | 9/2016 | Robinson | ............... | G01S 19/215 |

OTHER PUBLICATIONS

International Search Report and Written Opinion for Application No. PCT/US2019/035684 dated Sep. 27, 2019, 13 pages.

* cited by examiner

*Primary Examiner* — Dao L Phan
(74) *Attorney, Agent, or Firm* — Kilpatrick Townsend & Stockton

(57) ABSTRACT

Systems and methods for identifying which of a plurality of signal types received by a global navigation satellite system (GNSS) receiver includes a spoofing signal. One method may include, for each particular signal type of the plurality of signal types, excluding the particular signal type, calculating a parameter of a GNSS receiver based on the received wireless signals having a plurality of remaining signal types, and calculating a residual score based on a variability associated with calculating the parameter, the residual score being one of a plurality of residual scores. The method may also include identifying an outlier of the plurality of residual scores and identifying which of the plurality of signal types includes a spoofing signal based on the outlier.

17 Claims, 13 Drawing Sheets

| k | Excluded Signal Types | R |
|---|---|---|
| 1 | GPS | 45.3 |
| 1 | SBAS | 40.0 |
| 1 | Galileo | 51.5 |
| 1 | GLONASS | 45.2 |
| 1 | BeiDou | 35.5 |
| 2 | GPS + SBAS | 40.1 |
| 2 | GPS + Galileo | 0.2 |
| 2 | GPS + GLONASS | 50.1 |
| 2 | GPS + BeiDou | 45.2 |
| 2 | SBAS + Galileo | 41.0 |
| 2 | SBAS + GLONASS | 42.0 |
| 2 | SBAS + BeiDou | 43.0 |
| 2 | Galileo + GLONASS | 50.1 |
| 2 | Galileo + BeiDou | 39.0 |
| 2 | GLONASS + BeiDou | 43.1 |

| k | Excluded Signal Types | R |
|---|---|---|
| 1 | GPS L1 C/A | 38.7 |
| 1 | GPS L2C | 40.5 |
| 1 | SBAS | 40.0 |
| 1 | Galileo E1 | 52.5 |
| 1 | Galileo E5A | 0.6 |
| 1 | GLONASS | 45.2 |
| 1 | BeiDou | 35.5 |

ANTI-SPOOFING SYSTEM FOR GNSS RECEIVERS

BACKGROUND

Global navigation satellite systems (GNSS) use wireless signals that are transmitted from medium Earth orbit (MEO) or geostationary Earth orbit (GEO) satellites to GNSS receivers to determine position, velocity, and time information for the GNSS receivers. Examples of currently operational GNSSs include the United States' Global Positioning System (GPS), the Russian Global Navigation Satellite System (GLONASS), the Chinese BeiDou Satellite Navigation System, the European Union's (EU) Galileo, and the Satellite-based Augmentation System (SBAS). Today, GNSS receivers are used in a wide range of applications, including navigation (e.g., for automobiles, planes, boats, persons, animals, freight, military precision-guided munitions, etc.), surveying, mapping, and time referencing. Further applications for GNSS technology will become available as new techniques for improving GNSS accuracy are introduced.

SUMMARY

In a first aspect of the present disclosure, a global navigation satellite system (GNSS) receiver is provided. The GNSS receiver may include an antenna for receiving wireless signals transmitted by a plurality of GNSS satellites having a plurality of signal types. The GNSS receiver may also include a radio frequency (RF) front end coupled to the antenna and configured to generate a plurality of samples related to the wireless signals. The GNSS receiver may further include a processor coupled to the RF front end and configured to generate GNSS position data based on the plurality of samples. In some embodiments, the processor is configured to perform operations including, for each particular signal type of the plurality of signal types, excluding the particular signal type, calculating a parameter of the GNSS receiver based on the wireless signals received from a subset of the plurality of GNSS satellites having a plurality of remaining signal types, and calculating a residual score based on a variability associated with calculating the parameter, the residual score being one of a plurality of residual scores. In some embodiments, the operations may also include identifying an outlier of the plurality of residual scores. In some embodiments, the operations may further include identifying which of the plurality of signal types includes a spoofing signal based on the outlier.

In some embodiments, the parameter of the GNSS receiver is the position of the GNSS receiver. In some embodiments, the operations also include, for each particular signal type of the plurality of signal types, generating a plurality of pseudoranges based on the wireless signals received from the subset of the plurality of GNSS satellites having the plurality of remaining signal types, and calculating a plurality of satellite residuals using the calculated position and the plurality of pseudoranges. In some embodiments, the variability associated with calculating the position is based on the plurality of satellite residuals. In some embodiments, the plurality of satellite residuals are equal to distances between the calculated position and spheres generated using the plurality of pseudoranges. In some embodiments, the operations further include, for each possible combination of two particular signal types of the plurality of signal types, excluding the two particular signal types, calculating a second position of the GNSS receiver based on the wireless signals received from a second subset of the plurality of GNSS satellites having a second plurality of remaining signal types, and calculating a second residual score of the plurality of residual scores based on a second variability associated with calculating the second position. In some embodiments, the plurality of GNSS satellites includes one or more of a Global Positioning System (GPS) satellite, a Global Navigation Satellite System (GLONASS) satellite, a BeiDou satellite, a Galileo satellite, and a Satellite-based Augmentation System (SBAS) satellite.

In a second aspect of the present disclosure, a method is provided. The method may include receiving wireless signals transmitted by a plurality of GNSS satellites having a plurality of signals types. The method may also include, for each particular signal type of the plurality of signal types, excluding the particular signal type, calculating a parameter of a GNSS receiver based on the wireless signals received from a subset of the plurality of GNSS satellites having a plurality of remaining signal types, and calculating a residual score based on a variability associated with calculating the parameter, the residual score being one of a plurality of residual scores. The method may further include identifying an outlier of the plurality of residual scores and identifying which of the plurality of signal types includes a spoofing signal based on the outlier.

In some embodiments, the parameter of the GNSS receiver is a position of the GNSS receiver. In some embodiments, the method further includes, for each particular signal type of the plurality of signal types, generating a plurality of pseudoranges based on the wireless signals received from the subset of the plurality of GNSS satellites having the plurality of remaining signal types, and calculating a plurality of satellite residuals using the calculated position and the plurality of pseudoranges. In some embodiments, the variability associated with calculating the position is based on the plurality of satellite residuals. In some embodiments, the plurality of satellite residuals are equal to distances between the calculated position and spheres generated using the plurality of pseudoranges. In some embodiments, the method further includes, for each possible combination of two particular signal types of the plurality of signal types, excluding the two particular signal types, calculating a second position of the GNSS receiver based on the wireless signals received from a second subset of the plurality of GNSS satellites having a second plurality of remaining signal types, and calculating a second residual score of the plurality of residual scores based on a second variability associated with calculating the second position. In some embodiments, the plurality of GNSS satellites includes one or more of a GPS satellite, a GLONASS satellite, a BeiDou satellite, a Galileo satellite, and a SBAS satellite.

In a third aspect of the present disclosure, a non-transitory computer-readable medium is provided. In some embodiments, the non-transitory computer-readable medium includes instructions that, when executed by a processor, cause the processor to perform the method described above.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 8 illustrates a table containing residual scores calculated during performance of method, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Spoofing of a global navigation satellite system (GNSS) typically refers to the situation in which an attacker transmits a signal that has the same modulation characteristics as the live sky GNSS signal. If the attacker is successful, the receiver is "captured" by the spoofed signal and tracks that signal instead of the signal from the satellite. By delaying or advancing the spoofed signal relative to the live sky signal the attacker can then adjust the measurements the receiver generates and hence move the computed position and/or time of the receiver. A second type of spoofing captures the receiver as just described, but then transmits a different ephemeris message (the data the satellite transmits to describe its location), thereby causing the receiver to change position. A hybrid spoofer can employ both techniques.

Spoofing can have a variety of ramifications including but not limited to: safety of life (e.g., planes, ships, autonomous vehicles reporting the incorrect position), financial (e.g., financial transactions are timed with GNSS, tolling applications may use GNSS), and loss of productivity (e.g., machinery equipped with GNSS receivers may cause rework, equipment downtime, damaged crops, etc.). A well-positioned jammer could easily affect a whole metropolitan area. For example a relatively low power jammer on Sutro Tower in San Francisco could deny the whole of San Francisco access to GNSS. Well-designed receivers typically reject satellite signals appearing too far away from their current location. For GPS, this means that only receivers within a radius of approximately 300 meters of the target will be affected, although a combination of jamming and spoofing can extend this range as the acquisition process can be vulnerable to spoofing.

Embodiments of the present disclosure include systems, methods, and other techniques for identifying a spoofing signal. Specifically, embodiments may identify which of a plurality of signal types received by a GNSS receiver include a spoofing signal. The GNSS receiver may respond to such identification by ignoring the compromised signal types and/or alerting a user of the GNSS receiver of the presence of the spoofing signal.

Figure 1:
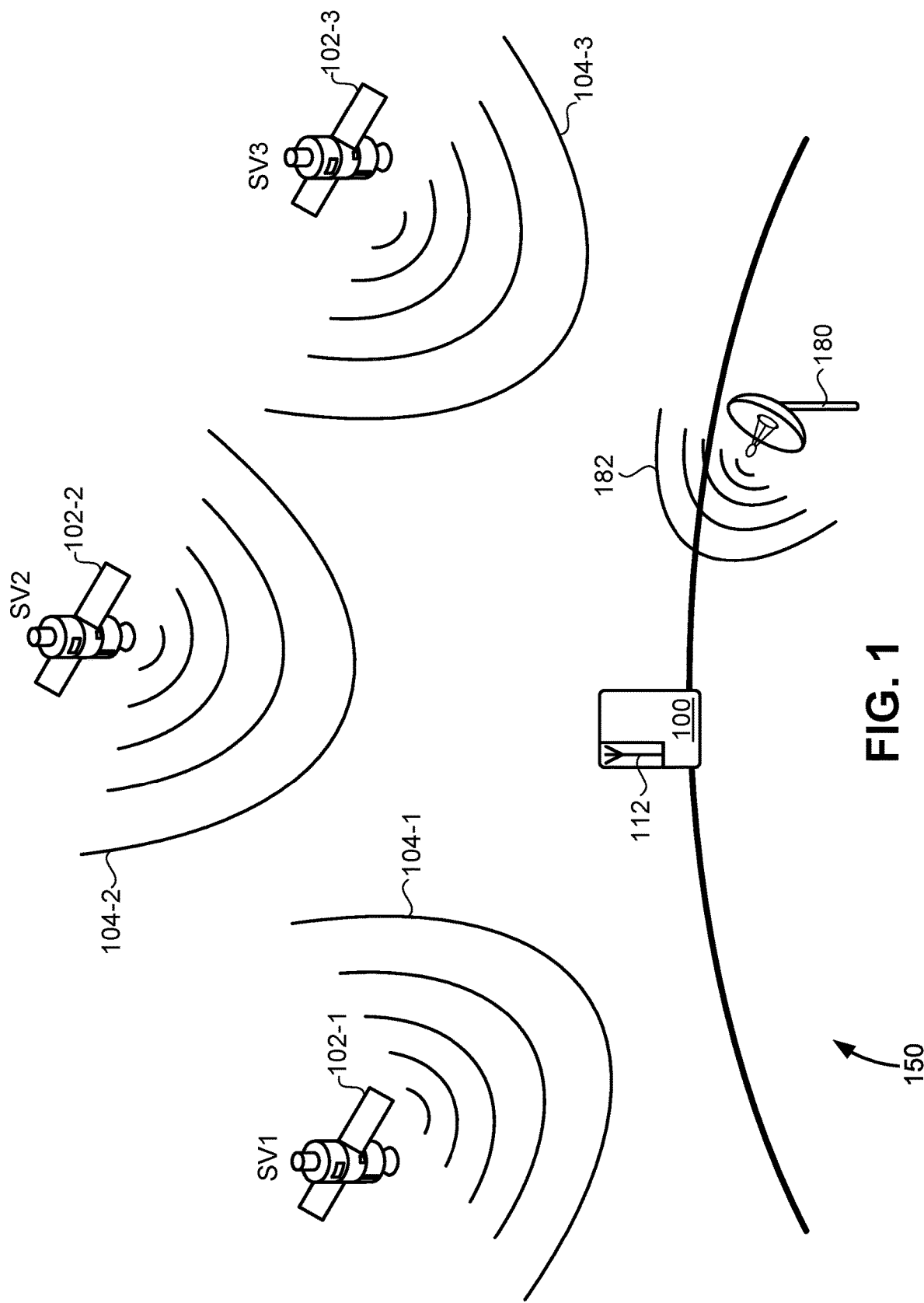
FIG. 1 illustrates a global navigation satellite system (GNSS), according to an embodiment of the present disclosure.

FIG. 1 illustrates a GNSS 150, according to an embodiment of the present disclosure. GNSS 150 includes one or more GNSS satellites 102, i.e., space vehicles (SV), in orbit above a GNSS receiver 100. GNSS satellites 102 may continuously, periodically, or intermittently broadcast wireless signals 104 containing pseudorandom noise (PRN) codes modulated onto carrier frequencies (e.g., L1 and/or L2 carrier frequencies). Transmitted wireless signals 104 may be received by an antenna 112 positioned within, on, or near GNSS receiver 100, which may be a patch antenna, a turnstile antenna, a helical antenna, a parabolic antenna, a phased-array antenna, a resistive plane antenna, a choke ring antenna, a radome antenna, among other possibilities. Wireless signals 104 corresponding to different GNSS satellites 102 may include different PRN codes that identify a particular GNSS satellite 102 such that GNSS receiver 100 may associate different distance estimates (i.e., pseudoranges) to different GNSS satellites 102. For example, GNSS satellite 102-1 broadcasts wireless signals 104-1 which contain a different PRN code than the PRN code contained in wireless signals 104-2 broadcasted by GNSS satellite 102-2. Similarly, GNSS satellite 102-3 broadcasts wireless signals 104-3 which contain a different PRN code than the PRN codes contained in wireless signals 104-1 and 104-2 broadcasted by GNSS satellites 102-1 and 102-2, respectively.

Each of GNSS satellites 102 may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo E5A, etc.). For example, GNSS satellite 102-1 may be a GPS satellite and may transmit wireless signals having a GPS L1 C/A signal type (i.e., wireless signals having frequencies within the GPS L1 band and having been modulated using C/A code). GNSS satellite 102-1 may additionally or alternatively transmit wireless signals having a GPS L2C signal type (i.e., wireless signals having frequencies within the GPS L2 band and having been modulated using L2 civil codes). In some embodiments, GNSS satellite 102-1 may additionally be a Galileo satellite and may transmit wireless signals having a Galileo signal type (e.g., Galileo E1). Accordingly, a single satellite may include the ability to transmit wireless signals of a variety of signal types.

Merely by way of example, GNSS receiver 100 may use the three distance estimates between itself and GNSS satellites 102-1, 102-2, and 102-3 to generate a position estimate through a process called trilateration. In some instances, trilateration involves generating three spheres having center locations corresponding to the locations of GNSS satellites 102 and radii corresponding to the distance estimates (i.e., pseudoranges). The three spheres intersect at two locations, one of which is more plausible than the other given the position of the earth. The less plausible location is disregarded and the more plausible location is used as the position estimate for GNSS receiver 100. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

In some embodiments, a spoofing antenna 180 may broadcast a spoofing signal 182 that is received by GNSS receiver 100. Spoofing signal 182 may be structured to resemble a normal GNSS signal, such as any of wireless signals 104. In some instances, spoofing signal 182 may include modulated information that causes GNSS receiver 100 to estimate its position to be somewhere other than where it actually is or to estimate the time to be different than what it actually is. In some instances, spoofing signal 182 may initially be synchronized with one or more of wireless signals 104, and may subsequently increase in power and overpower wireless signals 104.

Figure 2:
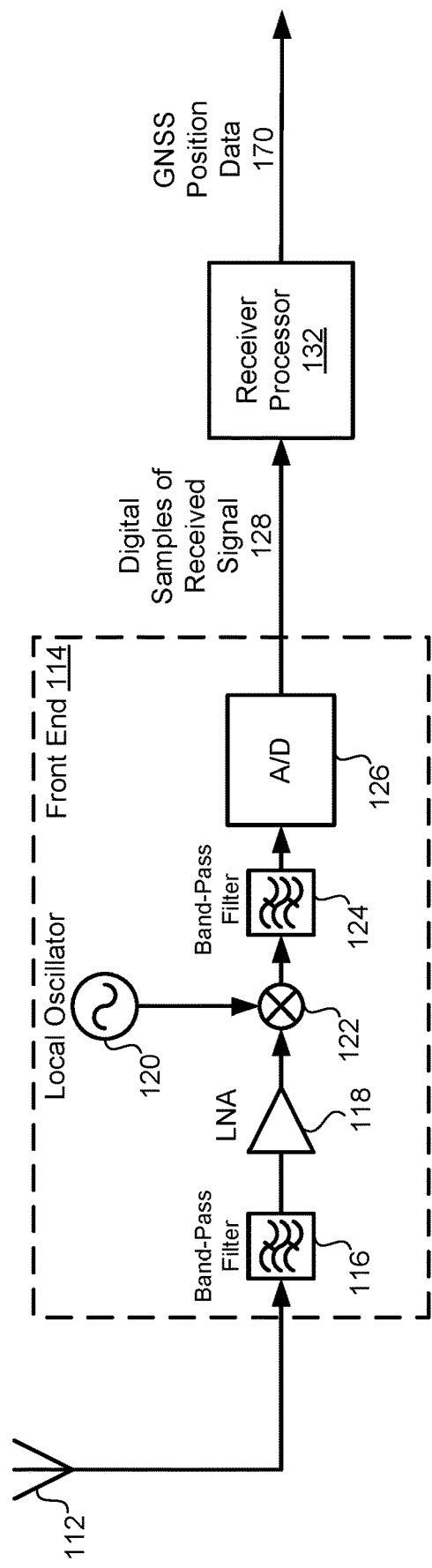
FIG. 2 illustrates a block diagram of a GNSS receiver, according to an embodiment of the present disclosure.

FIG. 2 illustrates a block diagram of GNSS receiver 100, according to an embodiment of the present disclosure. One or more components of GNSS receiver 100 as described in reference to FIG. 2 may correspond to conventional techniques. In some embodiments, GNSS receiver 100 includes antenna 112 for receiving wireless signals 104 and sending/routing a signal related to wireless signals 104 to an RF front end 114. Antenna 112 may be linearly or circularly polarized, may be mounted or embedded, may be a single antenna or an array antenna, may have a narrow or wide bandwidth, among other possibilities. RF front ends are well known in the art, and in some instances include a band-pass filter 116 for initially filtering out undesirable frequency components outside the frequencies of interest, a low-noise amplifier (LNA) 118 for amplifying the received signal, a local oscillator 120 and a mixer 122 for down converting the received signal from RF to intermediate frequencies (IF), a band-pass filter 124 for removing frequency components outside IF, and an analog-to-digital (A/D) converter 126 for sampling the received signal to generate digital samples 128.

In some instances, RF front end 114 includes additional or fewer components than that shown in FIG. 2. For example, RF front end 114 may include a second local oscillator (90 degrees out of phase with respect to local oscillator 120), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to receiver processor 132. In some embodiments, digital samples corresponding to both in-phase and quadrature components may be included in digital samples 128. In some embodiments, receiver processor 132 may include one or more correlators.

Other components within RF front end 114 may include a phase-locked loop (PLL) for synchronizing the phase of local oscillator 120 with the phase of the received signal, and a phase shifter for generating a second mixing signal using local oscillator 120 that is 90 degrees out of phase with local oscillator 120. In some embodiments, RF front end 114 does not include band-pass filter 116 and LNA 118. In some embodiments, A/D converter 126 is coupled directly to antenna 112 and samples the RF signal directly without down-conversion to IF. In some embodiments, RF front end 114 only includes band-pass filter 116 and A/D converter 126. Other possible configurations of RF front end 114 are possible.

Digital samples 128 generated by RF front end 114 are sent to receiver processor 132. In some embodiments, receiver processor 132 performs one or more correlations on digital samples 128 using local codes to generate distance estimates between GNSS receiver 100 and GNSS satellites 102. In some embodiments, one or more components of receiver processor 132 (such as, for example, one or more correlators) include specific pieces of hardware, such as an application-specific integrated circuit (ASIC) or a field-programmable gate array (FPGA). In some embodiments, operations performed by receiver processor 132 are performed entirely in software using digital signal processing (DSP) techniques. After generating the distance estimates, receiver processor 132 may perform trilateration to generate a position estimate for GNSS receiver 100. After generating at least one position estimate, receiver processor 132 may output GNSS position data 170 comprising a plurality of GNSS points (i.e., position estimates). Each of the plurality of GNSS points may be a 3D coordinate represented by three real numbers. In some embodiments, the three numbers may correspond to latitude, longitude, and elevation/altitude. In other embodiments, the three numbers may correspond to X, Y, and Z positions. GNSS position data 170 may be outputted to be displayed to a user, transmitted to a separate device (e.g., computer, smartphone, server, etc.) via a wired or wireless connection, or further processed, among other possibilities.

Figure 3A:
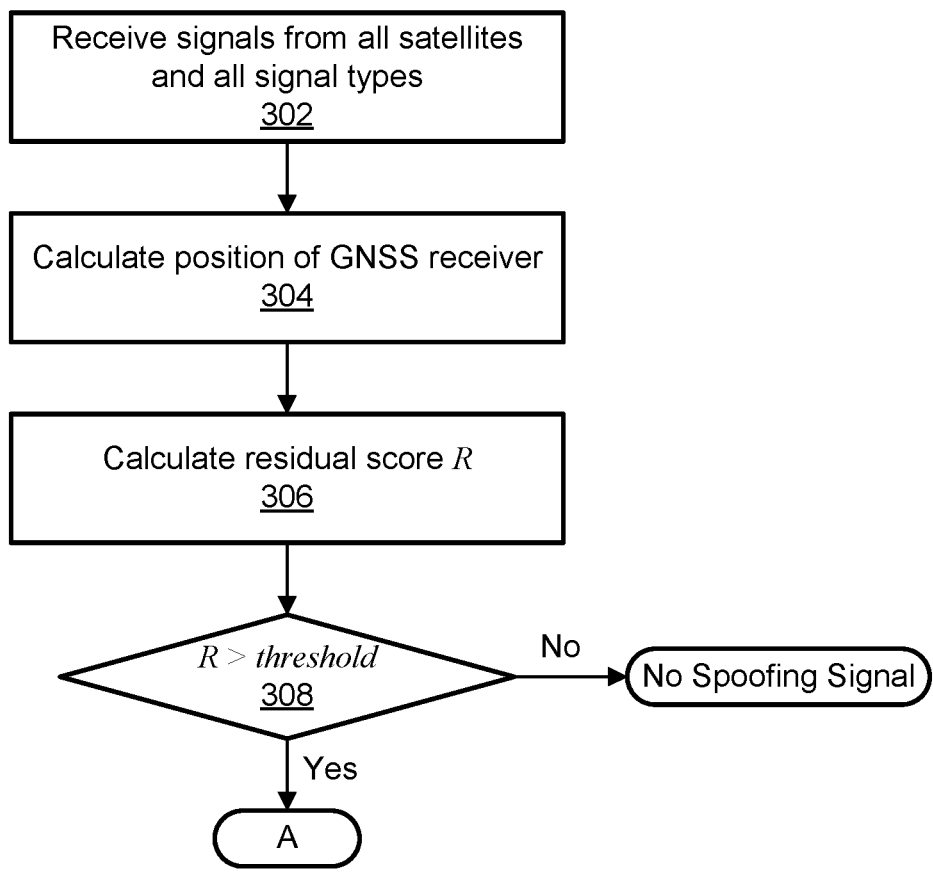
FIGS. 3A and 3B illustrate a method of identifying which of a plurality of signal types received by a GNSS receiver includes a spoofing signal, according to an embodiment of the present disclosure.
Figure 3B:
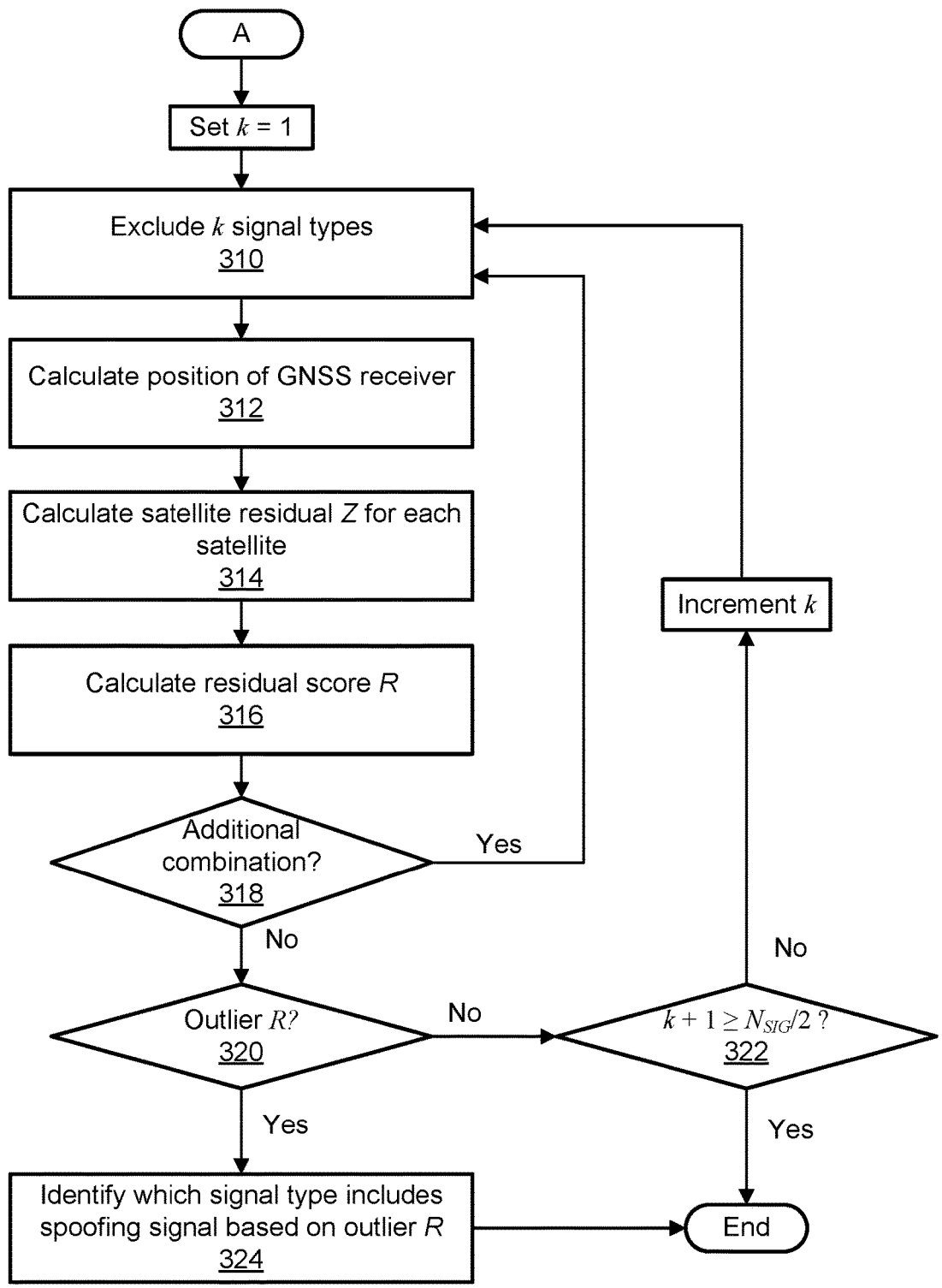

FIGS. 3A and 3B illustrate a method 300 of identifying which of a plurality of signal types received by GNSS receiver 100 includes a spoofing signal, according to an embodiment of the present disclosure. Performance of method 300 may including performing additional or fewer steps than that shown in FIGS. 3A and 3B. Furthermore, the steps shown need not be performed in the order shown. In some embodiments, one or more steps of method 300 may be performed by or initiated by a single processor. In some embodiments, one or more steps of method 300 are performed at least in part by different components of GNSS receiver 100.

At step 302, wireless signals transmitted by a plurality of GNSS satellites having a plurality of signal types are received. In some embodiments, step 302 may include receiving all wireless signals that are available to GNSS receiver 100. In some embodiments, upon receiving the wireless signals, it may be determined whether the number of signal types $N_{SIG}$ is greater than or equal to 3 and whether the number of satellites N is greater than or equal to 4. In some instances, method 300 may terminate if either criteria is not satisfied because there may be insufficient data to identify a spoofing signal.

Steps 304, 306, and 308 are optional steps that may be performed to reduce CPU loading by exiting the method prior to performing the recursive steps beginning at step 310.

At step 304, the position of GNSS receiver 100 is calculated using each of the wireless signals received in step 302. Calculating the position of GNSS receiver 100 may include generating a plurality of pseudoranges based on the received wireless signals, determining a plurality of satellite positions based on the received wireless signals, and solving a set of equations incorporating the plurality of pseudoranges and the plurality of satellite positions to calculate the position of GNSS receiver 100. In some embodiments, calculating the position of GNSS receiver 100 may further include calculating a plurality of spheres using the plurality of pseudoranges and the plurality of satellite positions. For example, the satellite positions may be used as the center points of the spheres and the pseudoranges may be used as the radii of the spheres.

At step 306, a residual score R is calculated based on a variability associated with calculating the position of GNSS receiver 100. In some embodiments, the residual score R may result from a mathematical operation performed on a plurality of satellite residuals Z calculated as the distances between the calculated position of GNSS receiver 100 and the spheres generated using the pseudoranges and the satellite positions. For example, the satellite residual Z for a particular satellite may be equal to the distance between the calculated position of GNSS receiver 100 and the nearest point of the sphere generated using the pseudorange for the particular satellite and the position of the particular satellite. In some embodiments, the satellite residual Z may be the square of the distance. After every satellite residual Z has been calculated, the residual score R may be calculated as the direct sum of the satellite residuals Z, the weighted sum of the satellite residuals Z, the sum of the satellite residuals Z squared, among other possibilities.

In some embodiments, the residual score R may be calculated using the equation:

$$R = \frac{\sum_{i=1}^{N} \frac{Z_i \cdot Z_i}{V_i}}{N-4}$$

where $Z_i$ is the i-th satellite residual, $V_i$ is the expected variance of $Z_i$, and N is the number of satellites. In some embodiments, the residual score R may alternatively be calculated using the equation:

$$R = c \sum_{i=1}^{N} Z_i^2$$

where c is a constant that scales the residual score R appropriately. In some embodiments, c may be a function of N.

At step 308, the residual score R is compared to a threshold. If it is determined that the residual score R is less than (or, in some embodiments, equal to) the threshold, then it is determined that there is no spoofing signal, i.e., that none of the plurality of signal types received by GNSS receiver 100 includes a spoofing signal. If it is determined that the residual score R is greater than (or, in some embodiments, equal to) the threshold, then method 300 proceeds to step 310. Prior to performing step 310, a variable k is initialized to 1.

At step 310, k signal types are excluded. Excluding k signal types may include completely ignoring or placing significantly less emphasis on the received wireless signals having one of the k excluded signal types in subsequent calculations performed in any of the following steps. Signal types that are excluded will continue to be excluded until step 310 is performed again, at which point new signals types are excluded.

At step 312, the position of GNSS receiver 100 is calculated using each of the wireless signals that do not have an excluded signal type (i.e., the wireless signals that have one of the remaining signal types). Calculating the position of GNSS receiver 100 may include generating a plurality of pseudoranges based on the received wireless signals, determining a plurality of satellite positions based on the received wireless signals, and solving a set of equations incorporating the plurality of pseudoranges and the plurality of satellite positions to calculate the position of GNSS receiver 100. In some embodiments, calculating the position of GNSS receiver 100 may further include calculating a plurality of spheres using the plurality of pseudoranges and the plurality of satellite positions. For example, the satellite positions may be used as the center points of the spheres and the pseudoranges may be used as the radii of the spheres.

At step 314, a satellite residual Z calculated for each of the satellites transmitting wireless signals that do not have an excluded signal type. In some embodiments, the satellite residuals Z are equal to the distances between the calculated position of GNSS receiver 100 and the spheres generated using the pseudoranges and the satellite positions. For example, the satellite residual Z for a particular satellite may be equal to the distance between the calculated position of GNSS receiver 100 and the nearest point of the sphere generated using the pseudorange for the particular satellite and the position of the particular satellite. In some embodiments, the satellite residual Z may be the square of the distance.

At step 316, a residual score R is calculated based on a variability associated with calculating the position of GNSS receiver 100. In some embodiments, the residual score R may result from a mathematical operation performed on the plurality of satellite residuals Z calculated in step 314. The residual score R may be calculated as the direct sum of the satellite residuals Z, the weighted sum of the satellite residuals Z, the sum of the satellite residuals Z squared, among other possibilities. In some embodiments, if the position computation does not converge, then a large value of R is assumed.

At step 318, it is determined whether there are additional combinations for excluding k signal types. For example, when k=1, there may be $N_{SIG}$ different combinations for excluding k signal types. In some embodiments, the number of different combinations for excluding k signal types may be expressed using a binomial coefficient as:

$$\binom{N_{SIG}}{N_{SIG}-k} = \frac{N_{SIG}!}{k!(N_{SIG}-k)!}$$

If it is determined that there are additional combinations, method 300 returns to step 310 where a new combination of k signal types are excluded. If it is determined that there are no additional combinations, then method 300 proceeds to step 320. In some embodiments, if a particular combination results in less than four satellites remaining for subsequent calculations, then the combination is skipped entirely.

At step 320, it is determined whether any of the residual scores R calculated during different iterations through step 316 is an outlier. In some embodiments, a particular residual score R may be considered to be an outlier when it is at least two standard deviations from the mean of the residual scores R. In various embodiments, a particular residual score R may be considered to be an outlier when it is at least three, four, five, or six standard deviations from the mean of the residual scores R. In some embodiments, a particular residual score R may only be considered to be an outlier where it is smaller than the mean of the residual scores R. Other possibilities are contemplated. If it is determined that the residual scores R calculated during different iterations through step 316 includes an outlier, method 300 proceeds to step 324. Otherwise, method 300 proceeds to step 322.

At step 322, it is determined whether increasing k and repeating the recursive steps beginning at step 310 will allow identification of a spoofing signal (i.e., whether k is sufficiently low with respect to $N_{SIG}$). If it is determined that $k+1 \geq N_{SIG}/2$, then method 300 is terminated. Otherwise, k is incremented by one and method 300 returns to step 310.

At step 324, it is determined that a spoofing signal exists, and the signal type that includes the spoofing signal is identified based on the residual score R that was determined to be an outlier. For example, the signal type(s) that were excluded for the calculation of the residual score R that was determined to be an outlier are determined to include the spoofing signal. If multiple signal types are identified, then multiple spoofing signals may exist, although it is possible for a single spoofing signal to affect multiple signal types. In some instances, a single signal type may include multiple spoofing signals, such as a first spoofing signal having a GPS signal type and a second spoofing signal also having a GPS signal type.

Although method 300 is described in reference to calculating a position of GNSS receiver 100 (specifically steps 304 and 312), some embodiments may include calculating a parameter of GNSS receiver 100 other than position. For example, because some spoofing attacks only affect the receiver time estimate and leave the position estimate unaffected, in some embodiments a current time is calculated instead of or in addition to position. If the receiver time estimate is used instead of pseudorange, then a weighted-least squares algorithm can be used to compute the receiver time estimate, and a relative clock offset (difference between each individual receiver time estimate and a combined receiver time estimate) can be used to calculate the satellite residuals Z and the residual score R.

Another parameter that may be calculated instead of or in addition to position is velocity. If Doppler is used instead of pseudorange, then a weighted-least squares algorithm can be used to compute velocity and time drift. The velocity domain still allows calculation of the satellite residuals Z and the residual score R. Because GNSS systems use very stable atomic clocks, clock constraints can be applied to limit the relative time drift between systems and signals. In some embodiments, a spoofing attack may be more quickly detected in the velocity domain because Doppler measurements tend to have less noise than pseudorange measurements.

Figure 4A:
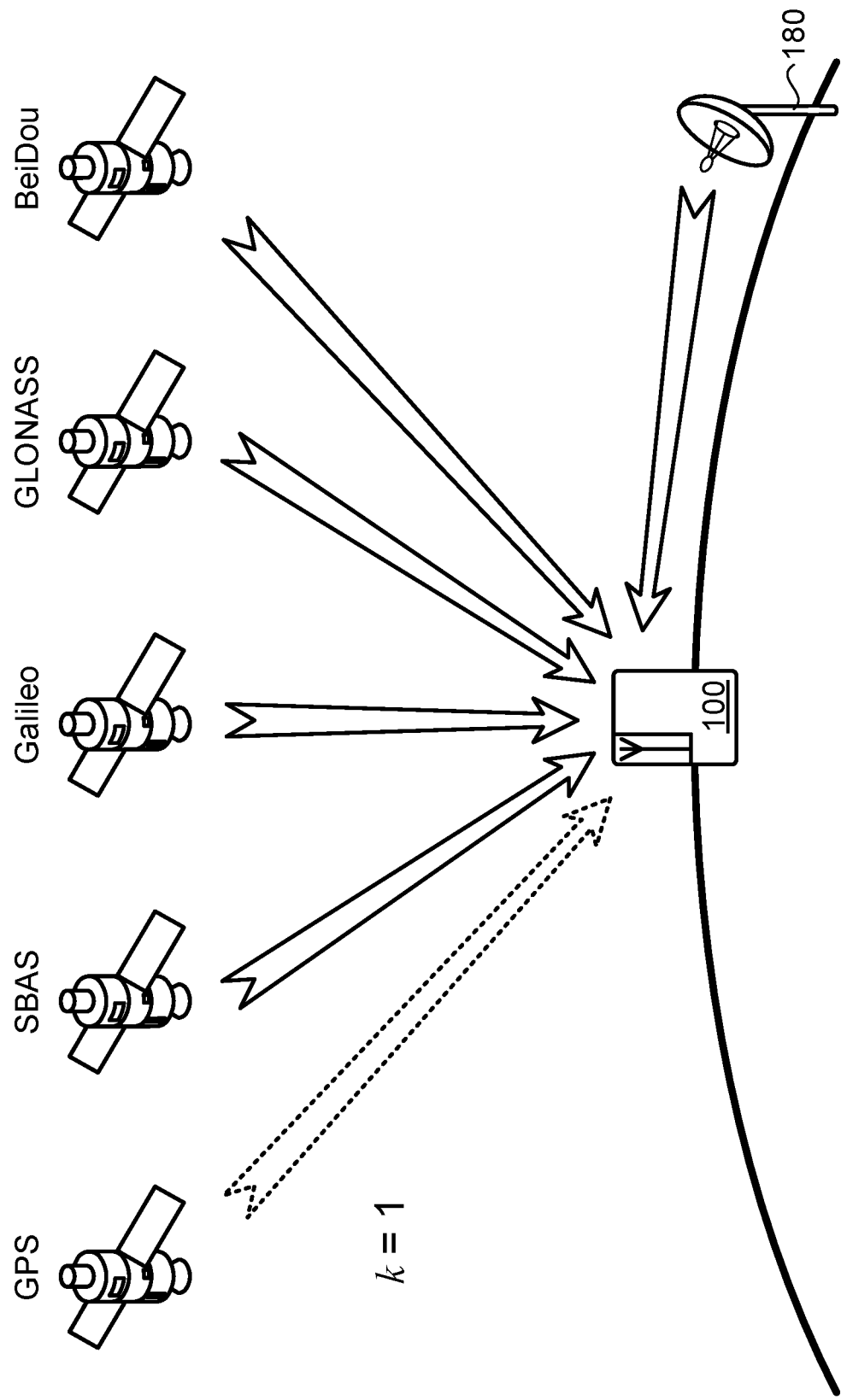
FIGS. 4A and 4B illustrate an exclusion of various signal types, according to an embodiment of the present disclosure.
Figure 4B:
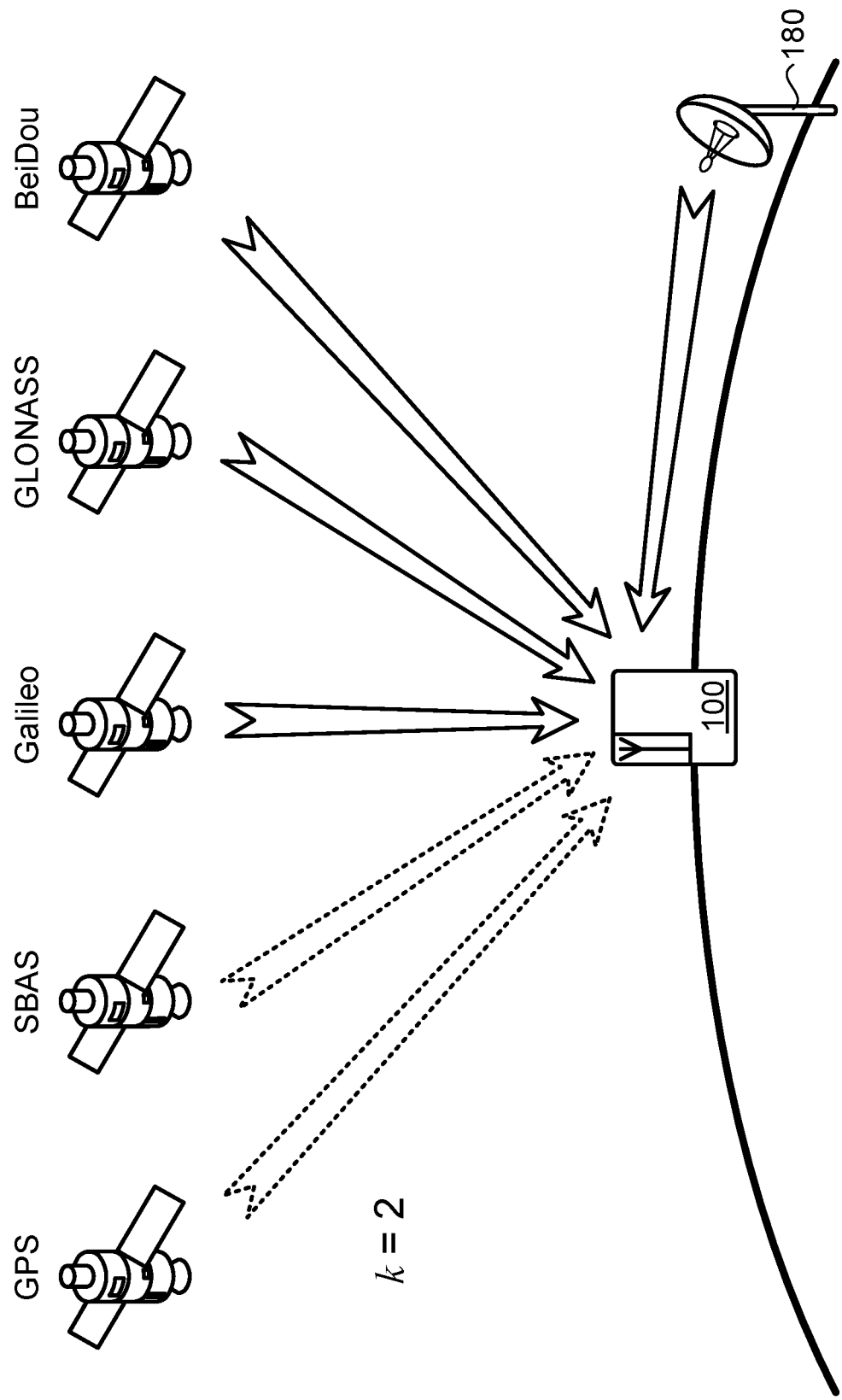

FIGS. 4A and 4B illustrate an exclusion of k signal types, corresponding to step 310 of method 300, according to a particular example. In reference to FIG. 4A, when k=1, wireless signals from a GPS satellite may be excluded from subsequent calculations until step 310 is again performed and a new signal type or combination of signal types are excluded. For example, when step 310 is performed a second time, wireless signals from a SBAS satellite may be excluded and wireless signals from the GPS satellite may no longer be excluded. When step 310 is performed a third, fourth, and fifth time, wireless signals from a Galileo, a GLONASS, and a BeiDou satellite may be excluded, respectively.

In reference to FIG. 4B, when k=2, wireless signals from the GPS satellite and the SBAS satellite may be simultaneously excluded from subsequent calculations until step 310 is again performed. For example, when step 310 is performed a second time (for when k=2), wireless signals from the GPS satellite and the Galileo satellite may be excluded. Step 310 is repeatedly performed until all possible combinations of exclusions have been used.

Figure 5:
FIG. 5 illustrates a table containing residual scores calculated during performance of a method, according to an embodiment of the present disclosure.

FIG. 5 illustrates a table 500 containing residual scores R calculated during performance of method 300, according to a particular example. In the particular example shown in FIG. 5, in step 316 the residual scores R are calculated and in step 320 it is determined that the residual score R calculated with GPS excluded is an outlier (R=0.1). It is therefore determined that the wireless signals from the GPS satellite include a spoofing signal.

Figure 6:
FIG. 6 illustrates a table containing residual scores calculated during performance of method, according to an embodiment of the present disclosure.

FIG. 6 illustrates a table 600 containing residual scores R calculated during performance of method 300, according to a particular example. In the particular example shown in FIG. 6, in step 316 the residual scores R with k=1 are calculated and in step 320 it is determined that none of the residual scores R are outliers. Because an outlier was not identified, method 300 continues with k=2. In step 316 the residual scores R with k=2 are calculated and in step 320 it is determined that the residual score R calculated with GPS and Galileo excluded is an outlier (R=0.2). It is therefore determined that the wireless signals from the GPS satellite and the Galileo satellite include a spoofing signal.

Figure 7A:
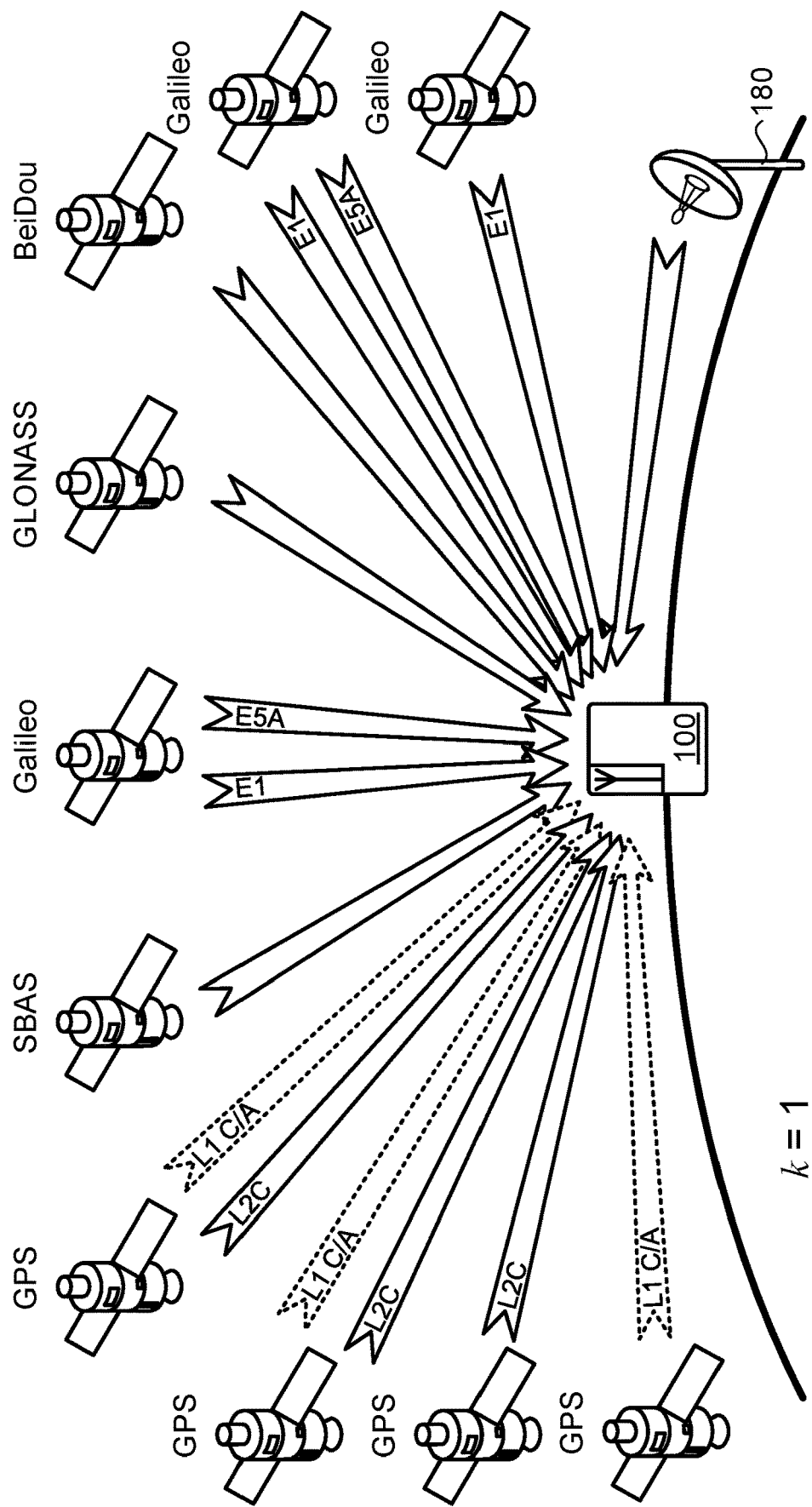
FIGS. 7A, 7B, and 7C illustrate an exclusion of various signal types, according to an embodiment of the present disclosure.
Figure 7B:
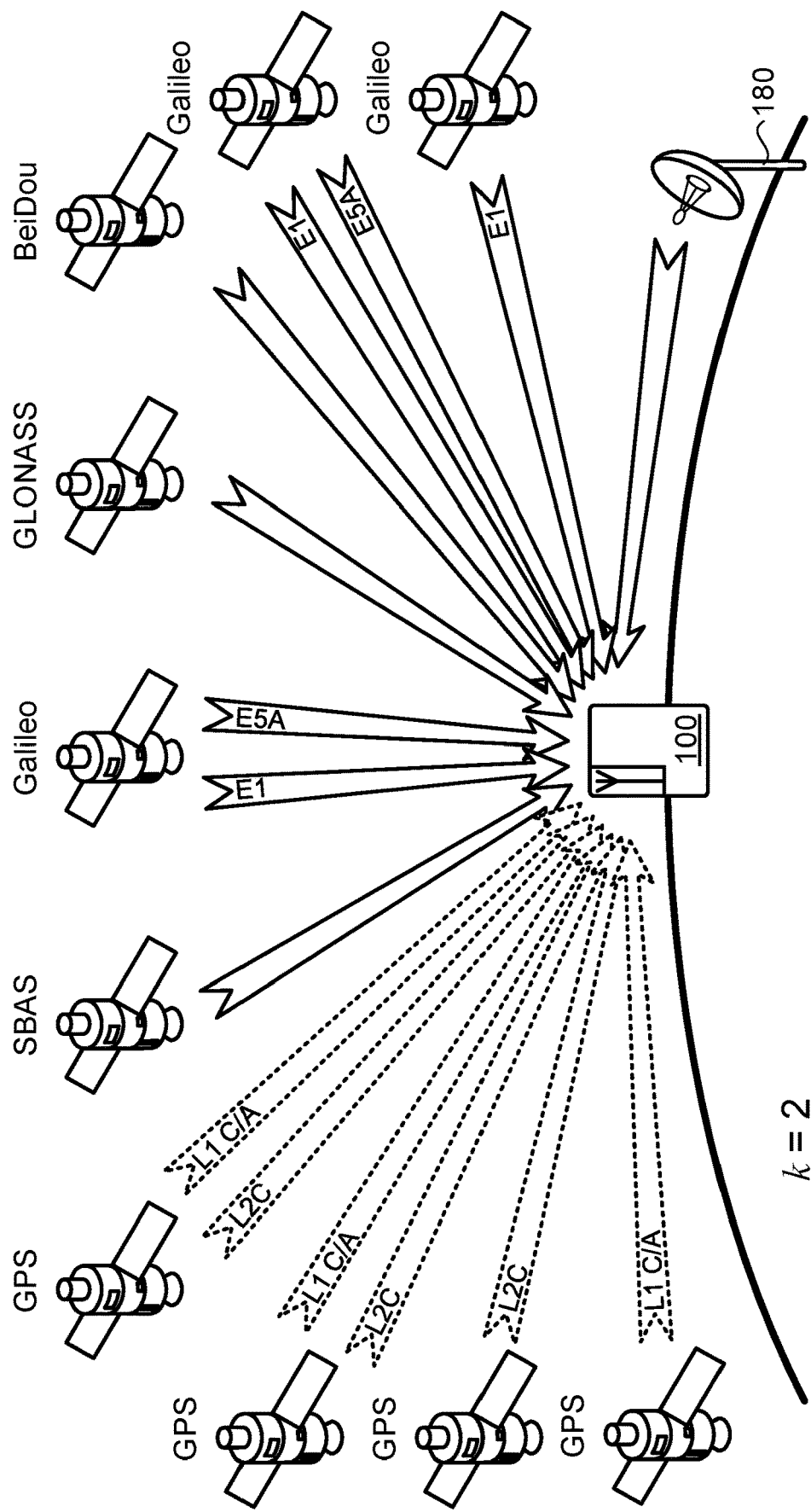
Figure 7C:
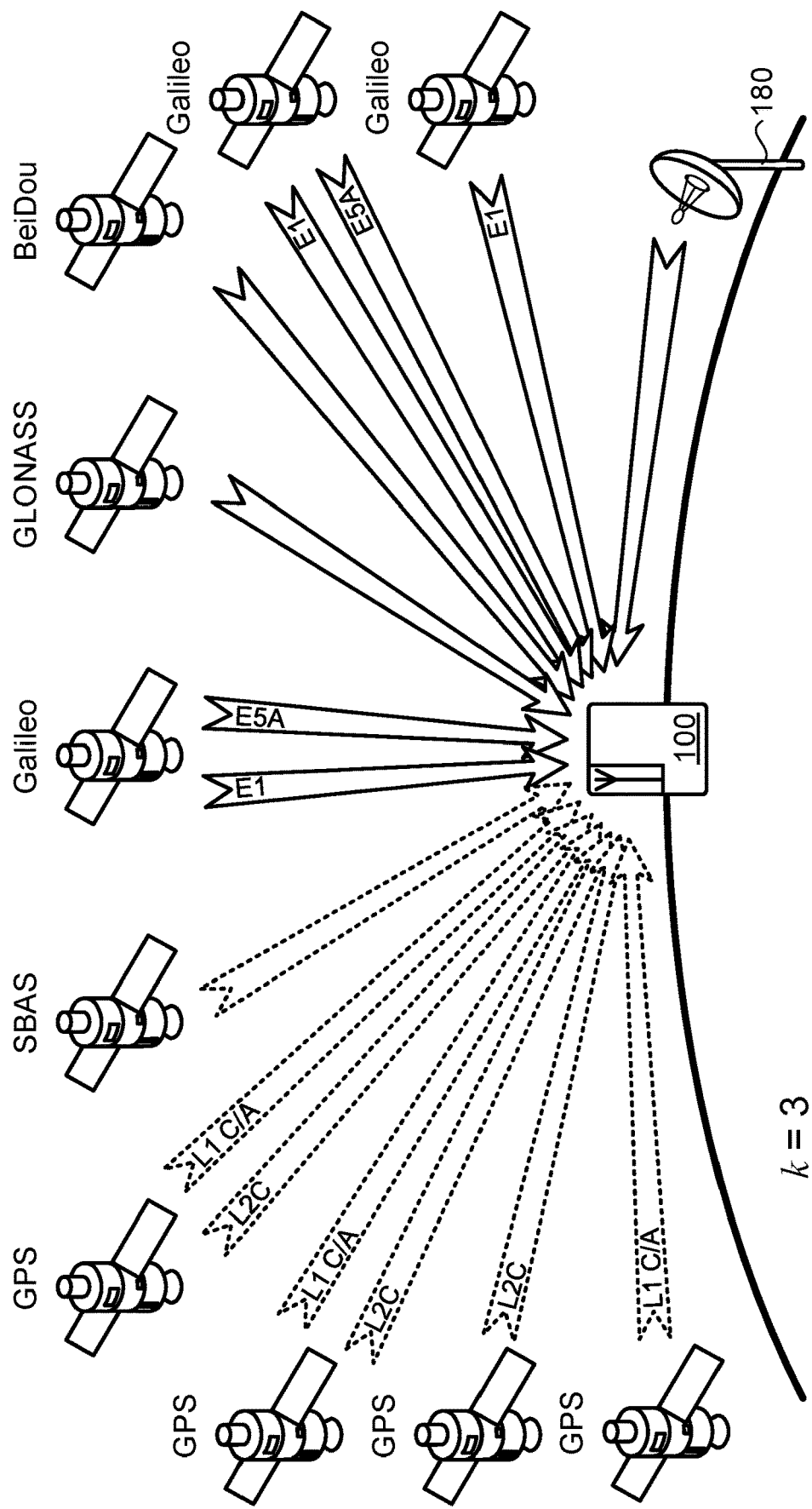

FIGS. 7A, 7B, and 7C illustrate an exclusion of k signal types, corresponding to step 310 of method 300, according to a particular example. In reference to FIG. 7A, when k=1, wireless signals having a GPS L1 C/A signal type (transmitted by three separate GPS satellites) may be excluded from subsequent calculations until step 310 is again performed and a new signal type or combination of signal types are excluded. For example, when step 310 is performed a second time, wireless signals having a GPS L2C signal type may be excluded and wireless signals having a GPS L1 C/A signal type may no longer be excluded. When step 310 is performed a third, fourth, fifth, sixth, and seventh time, wireless signals having a SBAS, a Galileo E1, a Galileo E5A, a GLONASS, and a BeiDou signal type may be excluded, respectively.

In reference to FIG. 7B, when k=2, wireless signals having a GPS L1 C/A signal type or a GPS L2C signal type may be simultaneously excluded from subsequent calculations until step 310 is again performed. For example, when step 310 is performed a second time (for when k=2), wireless signals having a GPS L2C signal type or a SBAS signal type may be excluded. Step 310 is repeatedly performed until all possible combinations of exclusions have been used.

In reference to FIG. 7C, when k=3, wireless signals having a GPS L1 C/A signal type, a GPS L2C signal type, or a SBAS signal type may be simultaneously excluded from subsequent calculations until step 310 is again performed. For example, when step 310 is performed a second time (for when k=3), wireless signals having a GPS L2C signal type, a SBAS signal type, or a Galileo E1 signal type may be excluded. Step 310 is repeatedly performed until all possible combinations of exclusions have been used.

FIG. 8 illustrates a table 800 containing residual scores R calculated during performance of method 300, according to a particular example. In the particular example shown in FIG. 8, in step 316 the residual scores R are calculated and in step 320 it is determined that the residual score R calculated with Galileo E5A excluded is an outlier (R=0.6). It is therefore determined that the wireless signals from the GPS satellite include a spoofing signal.

Figure 9:
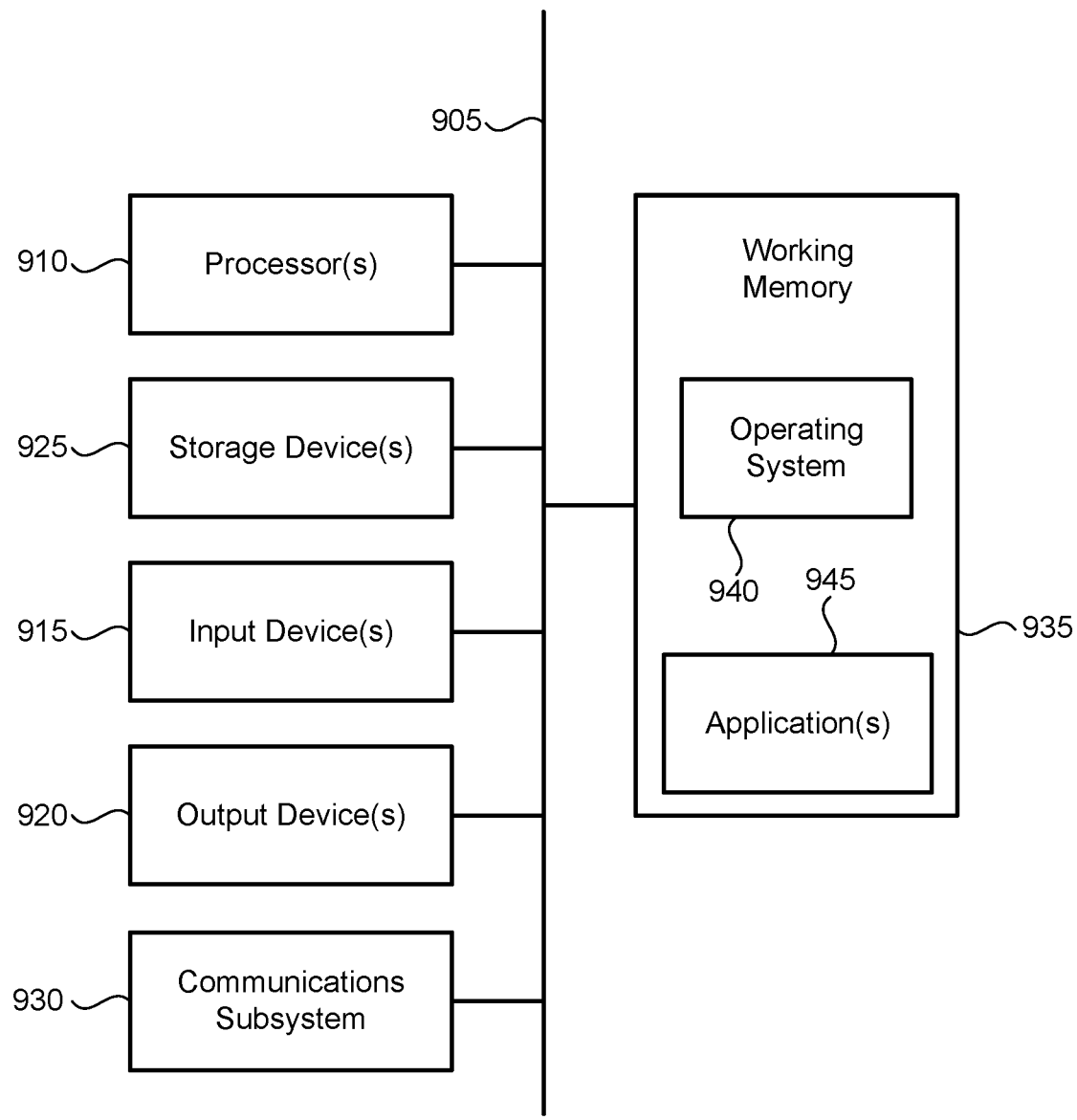
FIG. 9 illustrates a simplified computer system, according to an embodiment of the present disclosure.

FIG. 9 illustrates a simplified computer system 900, according to an embodiment of the present disclosure.

Computer system 900 as illustrated in FIG. 9 may be incorporated into devices described herein such as GNSS receiver 100. FIG. 9 provides a schematic illustration of one embodiment of computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or more integrated manner.

Computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include, without limitation a mouse, a keyboard, a camera, and/or the like; and one or more output devices 920, which can include, without limitation a display device, a printer, and/or the like.

Computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 900 might also include a communications subsystem 930, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into computer system 900, e.g., an electronic device as an input device 915. In some embodiments, computer system 900 will further comprise a working memory 935, which can include a RAM or ROM device, as described above.

Computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 900 and/or might take the form of source and/or installable code, which, upon compilation and/or installation on computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 900 to perform methods in accordance with various embodiments of the technology. According to a set of embodiments, some or all of the procedures of such methods are performed by computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A global navigation satellite system (GNSS) receiver comprising:
   an antenna for receiving wireless signals transmitted by a plurality of GNSS satellites having a plurality of signal types;
   a radio frequency (RF) front end coupled to the antenna and configured to generate a plurality of samples related to the wireless signals; and
   a processor coupled to the RF front end and configured to generate GNSS position data based on the plurality of samples, wherein the processor is configured to perform operations comprising:
      for each particular signal type of the plurality of signal types:
         excluding the particular signal type;
         calculating a position of the GNSS receiver based on the wireless signals received from a subset of the plurality of GNSS satellites having a plurality of remaining signal types; and
         calculating a residual score based on a variability associated with calculating the position, the residual score being one of a plurality of residual scores;
      identifying an outlier residual score from the plurality of residual scores; and
      identifying which of the plurality of signal types includes a spoofing signal based on the outlier residual score.

2. The GNSS receiver of claim 1, wherein the operations further comprise:
   for each particular signal type of the plurality of signal types:
      generating a plurality of pseudoranges based on the wireless signals received from the subset of the plurality of GNSS satellites having the plurality of remaining signal types; and
      calculating a plurality of satellite residuals using the position and the plurality of pseudoranges.

3. The GNSS receiver of claim 2, wherein the variability associated with calculating the position is based on the plurality of satellite residuals.

4. The GNSS receiver of claim 2, wherein the plurality of satellite residuals are equal to distances between the position and spheres generated using the plurality of pseudoranges.

5. The GNSS receiver of claim 1, wherein the operations further comprise:
for each possible combination of two particular signal types of the plurality of signal types:
excluding the two particular signal types;
calculating a second position of the GNSS receiver based on the wireless signals received from a second subset of the plurality of GNSS satellites having a second plurality of remaining signal types, wherein the position is a first position and the subset of the plurality of GNSS satellites is a first subset of the plurality of GNSS satellites; and
calculating a second residual score of the plurality of residual scores based on a second variability associated with calculating the second position, wherein the residual score is a first residual score and the variability of a first variability.

6. The GNSS receiver of claim 1, wherein the plurality of GNSS satellites includes one or more of:
a Global Positioning System (GPS) satellite;
a Global Navigation Satellite System (GLONASS) satellite;
a BeiDou satellite;
a Galileo satellite; and
a Satellite-based Augmentation System (SBAS) satellite.

7. A method comprising:
receiving wireless signals transmitted by a plurality of global navigation satellite system (GNSS) satellites having a plurality of signals types;
for each particular signal type of the plurality of signal types:
excluding the particular signal type;
calculating a position of a GNSS receiver based on the wireless signals received from a subset of the plurality of GNSS satellites having a plurality of remaining signal types; and
calculating a residual score based on a variability associated with calculating the position, the residual score being one of a plurality of residual scores;
identifying an outlier residual score from the plurality of residual scores; and
identifying which of the plurality of signal types includes a spoofing signal based on the outlier residual score.

8. The method of claim 7, further comprising:
for each particular signal type of the plurality of signal types:
generating a plurality of pseudoranges based on the wireless signals received from the subset of the plurality of GNSS satellites having the plurality of remaining signal types; and
calculating a plurality of satellite residuals using the position and the plurality of pseudoranges.

9. The method of claim 8, wherein the variability associated with calculating the position is based on the plurality of satellite residuals.

10. The method of claim 8, wherein the plurality of satellite residuals are equal to distances between the position and spheres generated using the plurality of pseudoranges.

11. The method of claim 7, further comprising:
for each possible combination of two particular signal types of the plurality of signal types:
excluding the two particular signal types;
calculating a second position of the GNSS receiver based on the wireless signals received from a second subset of the plurality of GNSS satellites having a second plurality of remaining signal types, wherein the position is a first position; and
calculating a second residual score of the plurality of residual scores based on a second variability associated with calculating the second position, wherein the residual score is a first residual score.

12. The method of claim 7, wherein the plurality of GNSS satellites includes one or more of:
a Global Positioning System (GPS) satellite;
a Global Navigation Satellite System (GLONASS) satellite;
a BeiDou satellite;
a Galileo satellite; and
a Satellite-based Augmentation System (SBAS) satellite.

13. A non-transitory computer-readable medium comprising instructions that, when executed by a processor, cause the processor to perform operations comprising:
receiving wireless signals transmitted by a plurality of global navigation satellite system (GNSS) satellites having a plurality of signals types;
for each particular signal type of the plurality of signal types:
excluding the particular signal type;
calculating a position of a GNSS receiver based on the wireless signals received from a subset of the plurality of GNSS satellites having a plurality of remaining signal types; and
calculating a residual score based on a variability associated with calculating the position, the residual score being one of a plurality of residual scores;
identifying an outlier residual score from the plurality of residual scores; and
identifying which of the plurality of signal types includes a spoofing signal based on the outlier residual score.

14. The non-transitory computer-readable medium of claim 13, wherein the operations further comprise:
for each particular signal type of the plurality of signal types:
generating a plurality of pseudoranges based on the wireless signals received from the subset of the plurality of GNSS satellites having the plurality of remaining signal types; and
calculating a plurality of satellite residuals using the position and the plurality of pseudoranges.

15. The non-transitory computer-readable medium of claim 14, wherein the variability associated with calculating the position is based on the plurality of satellite residuals.

16. The non-transitory computer-readable medium of claim 14, wherein the plurality of satellite residuals are equal to distances between the position and spheres generated using the plurality of pseudoranges.

17. The non-transitory computer-readable medium of claim 13, wherein the operations further comprise:
for each possible combination of two particular signal types of the plurality of signal types:
excluding the two particular signal types;
calculating a second position of the GNSS receiver based on the wireless signals received from a second subset of the plurality of GNSS satellites having a second plurality of remaining signal types, wherein the position is a first position; and
calculating a second residual score of the plurality of residual scores based on a second variability associated with calculating the second position, wherein the residual score is a first residual score.

* * * * *